(12) United States Patent
Tuineag et al.

(10) Patent No.: US 10,527,178 B2
(45) Date of Patent: *Jan. 7, 2020

(54) AXIALLY ALIGNED ROTATIONALLY ADJUSTABLE FLOW CONTROL VALVE

(71) Applicant: Griswold Controls, LLC, Irvine, CA (US)

(72) Inventors: Stefan I. Tuineag, Irvine, CA (US); Bryan Holloway, Irvine, CA (US)

(73) Assignee: Griswold Controls, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,029

(22) Filed: Sep. 11, 2018

(65) Prior Publication Data

US 2019/0072190 A1 Mar. 7, 2019

Related U.S. Application Data

(63) Continuation of application No. 15/332,450, filed on Oct. 24, 2016, now Pat. No. 10,072,761, which is a continuation of application No. 14/457,120, filed on Aug. 12, 2014, now Pat. No. 9,476,509, which is a continuation-in-part of application No. 14/243,611, filed on Apr. 2, 2014, now Pat. No. 9,400,057.

(51) Int. Cl.
| | |
|---|---|
| *F16K 3/02* | (2006.01) |
| *F16K 3/08* | (2006.01) |
| *G01F 1/44* | (2006.01) |
| *G01F 1/40* | (2006.01) |
| *G01F 15/00* | (2006.01) |
| *G05D 7/06* | (2006.01) |
| *F16K 3/32* | (2006.01) |
| *F16K 31/44* | (2006.01) |

(52) U.S. Cl.
CPC ............ *F16K 3/085* (2013.01); *F16K 3/0209* (2013.01); *F16K 3/029* (2013.01); *F16K 3/32* (2013.01); *F16K 31/44* (2013.01); *G01F 1/40* (2013.01); *G01F 1/44* (2013.01); *G01F 15/005* (2013.01); *G05D 7/0635* (2013.01); *Y10T 137/776* (2015.04); *Y10T 137/87917* (2015.04)

(58) Field of Classification Search
None
See application file for complete search history.

(56) References Cited

U.S. PATENT DOCUMENTS

| | | | | |
|---|---|---|---|---|
| 5,025,833 | A * | 6/1991 | Hendrick | ................ F16K 3/085 137/625.31 |
| 5,127,438 | A * | 7/1992 | Williams | ................ F16K 3/085 137/562 |

* cited by examiner

*Primary Examiner* — John Fox
(74) *Attorney, Agent, or Firm* — K. David Crockett, Esq.; Crockett & Crockett, PC

(57) ABSTRACT

A rotationally adjustable valve is disclosed whereby the user is able to control the flow of fluids from complete shutoff to maximum flow by rotating the adjustment means of the valve, said rotation being axial to the flow of the fluid. Additionally, the user is able to attach high and low pressure test probes directly to the valve, as it is rotatably adjusted, so that additional equipment is not required next to the valve. An embodiment of this invention includes the use of an adjustable Cv disk to set the maximum flow of the valve, rather than just create a simple 180° on/off, very similar to a current 90° ball valve that this device will replace.

2 Claims, 7 Drawing Sheets

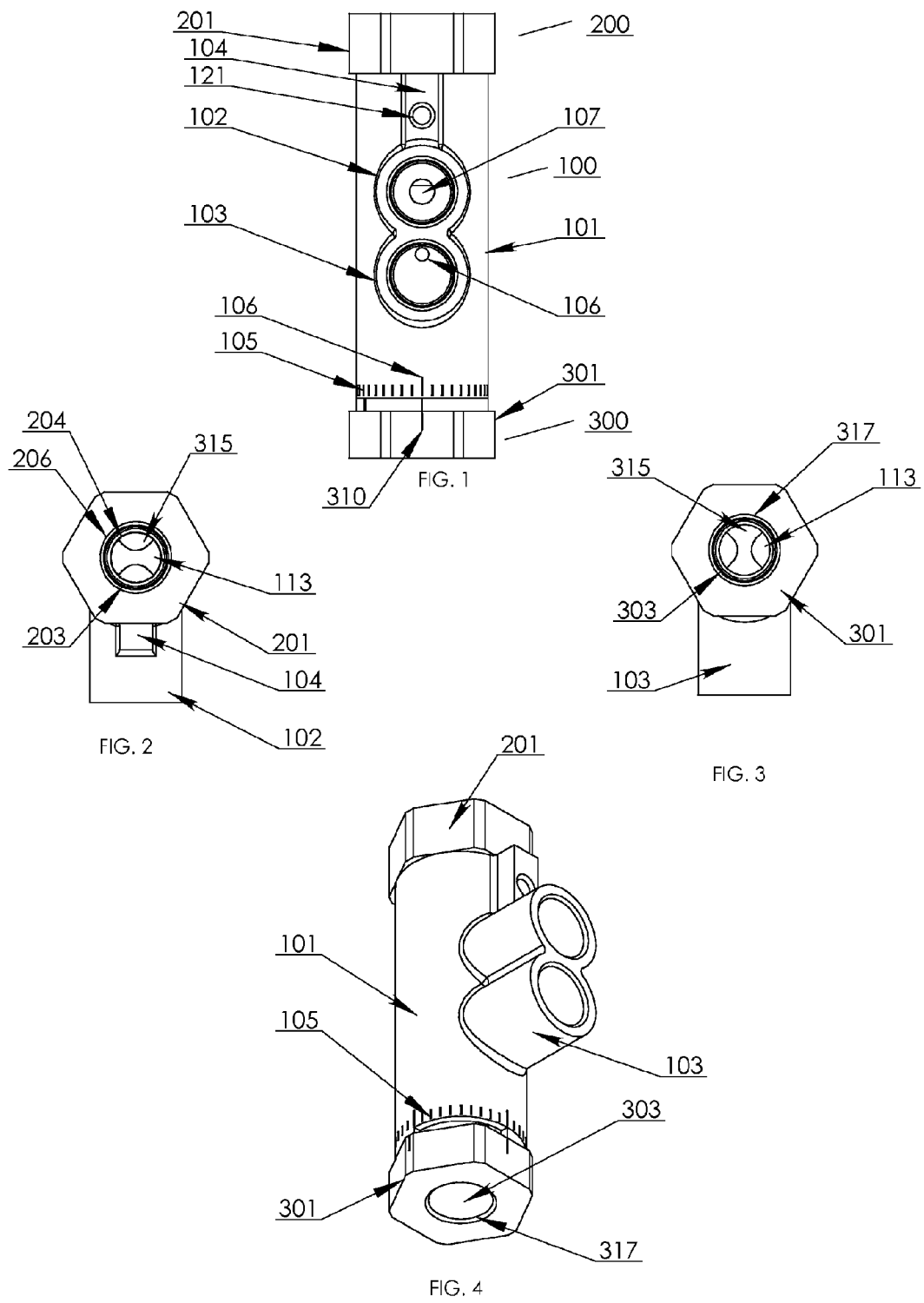

Percentage Open

0%   20%   75%   95%

201

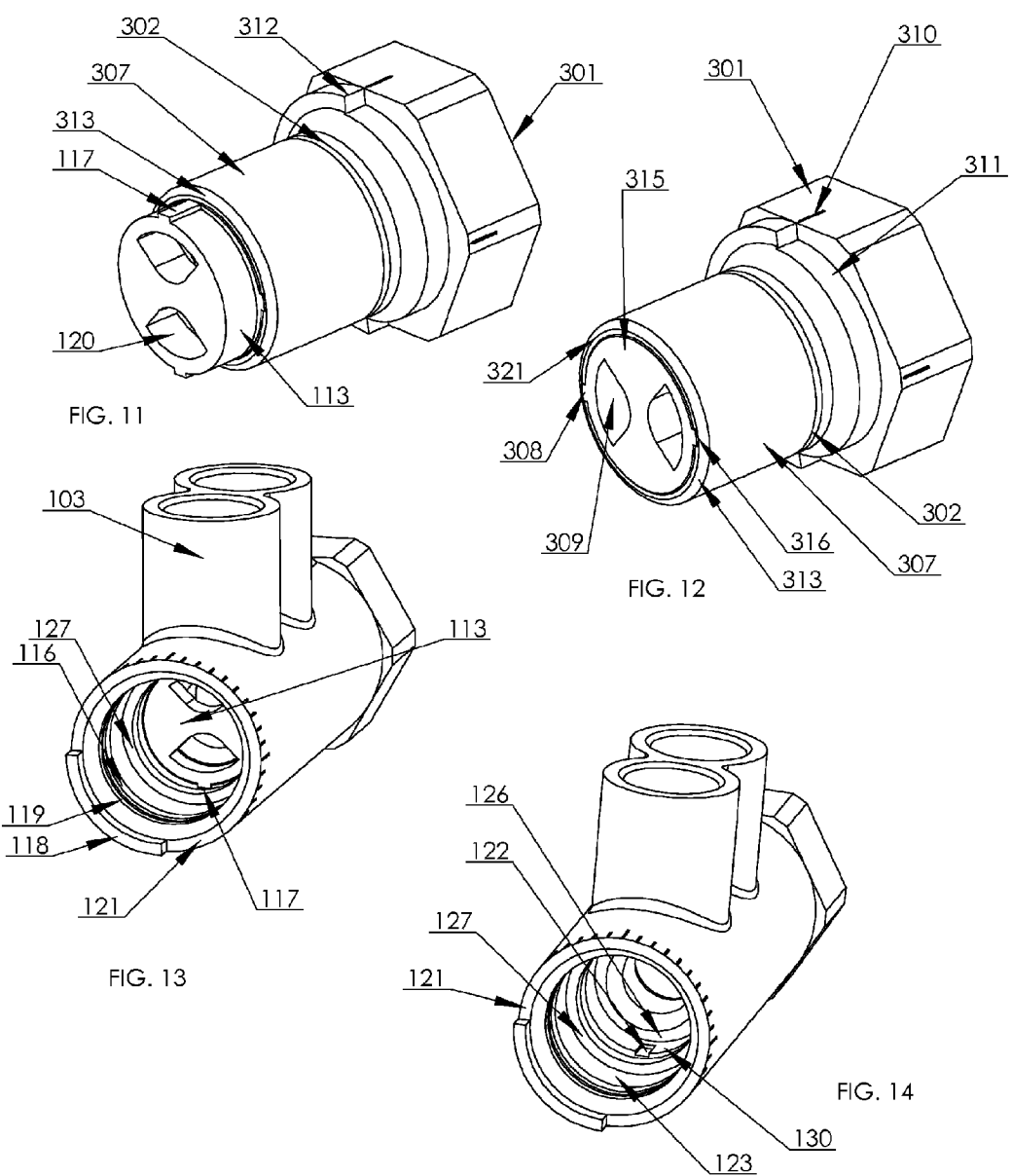

FIG. 15 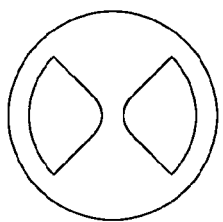 113  FIG. 15A
FIG. 16 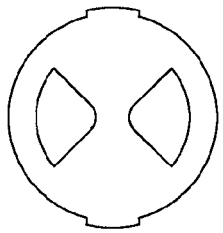 315 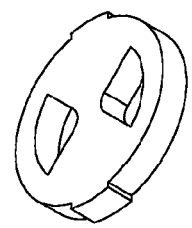 FIG. 16A
FIG. 17 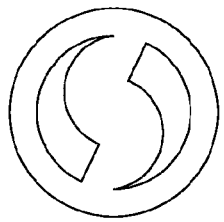 415 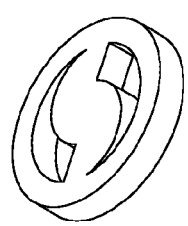 FIG. 17A
FIG. 18 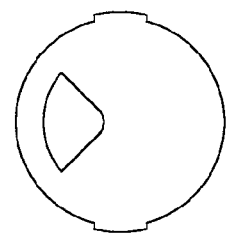 113A  FIG. 18A
FIG. 19 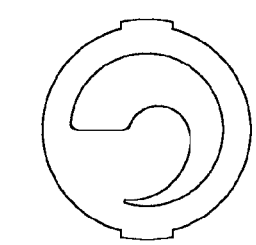 415A 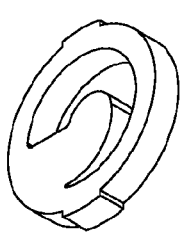 FIG. 19A

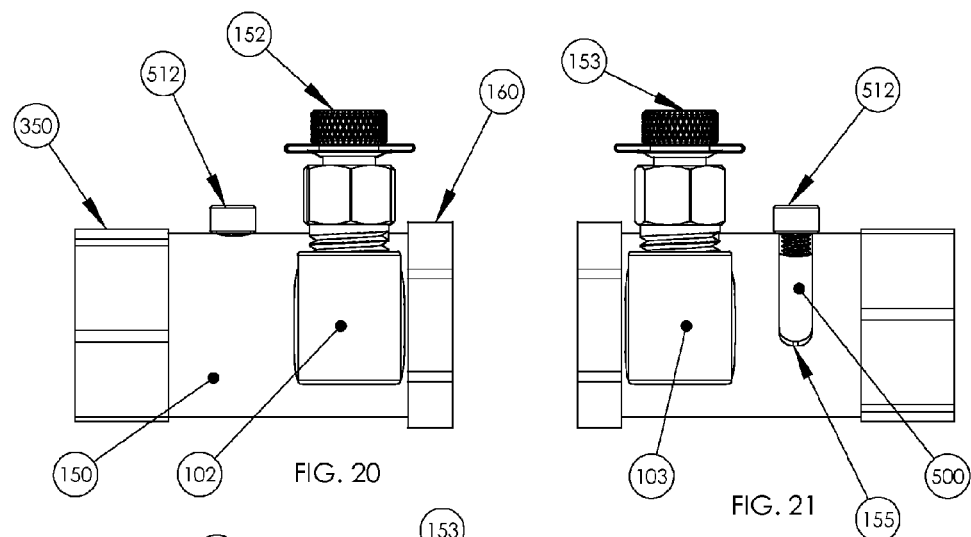
FIG. 20
FIG. 21
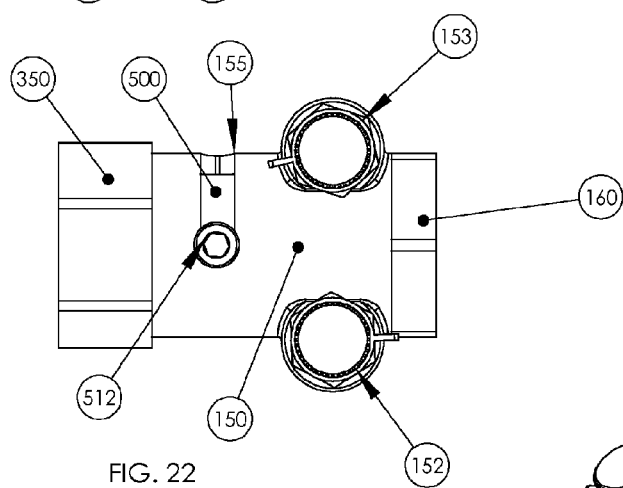
FIG. 22
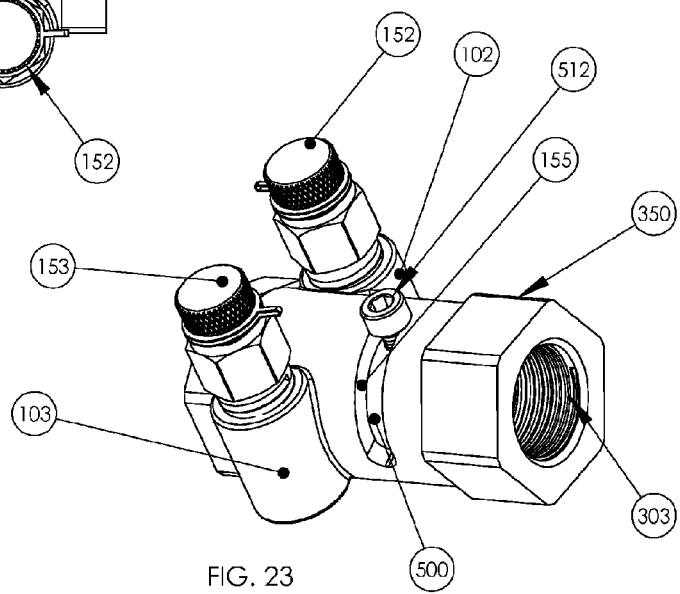
FIG. 23

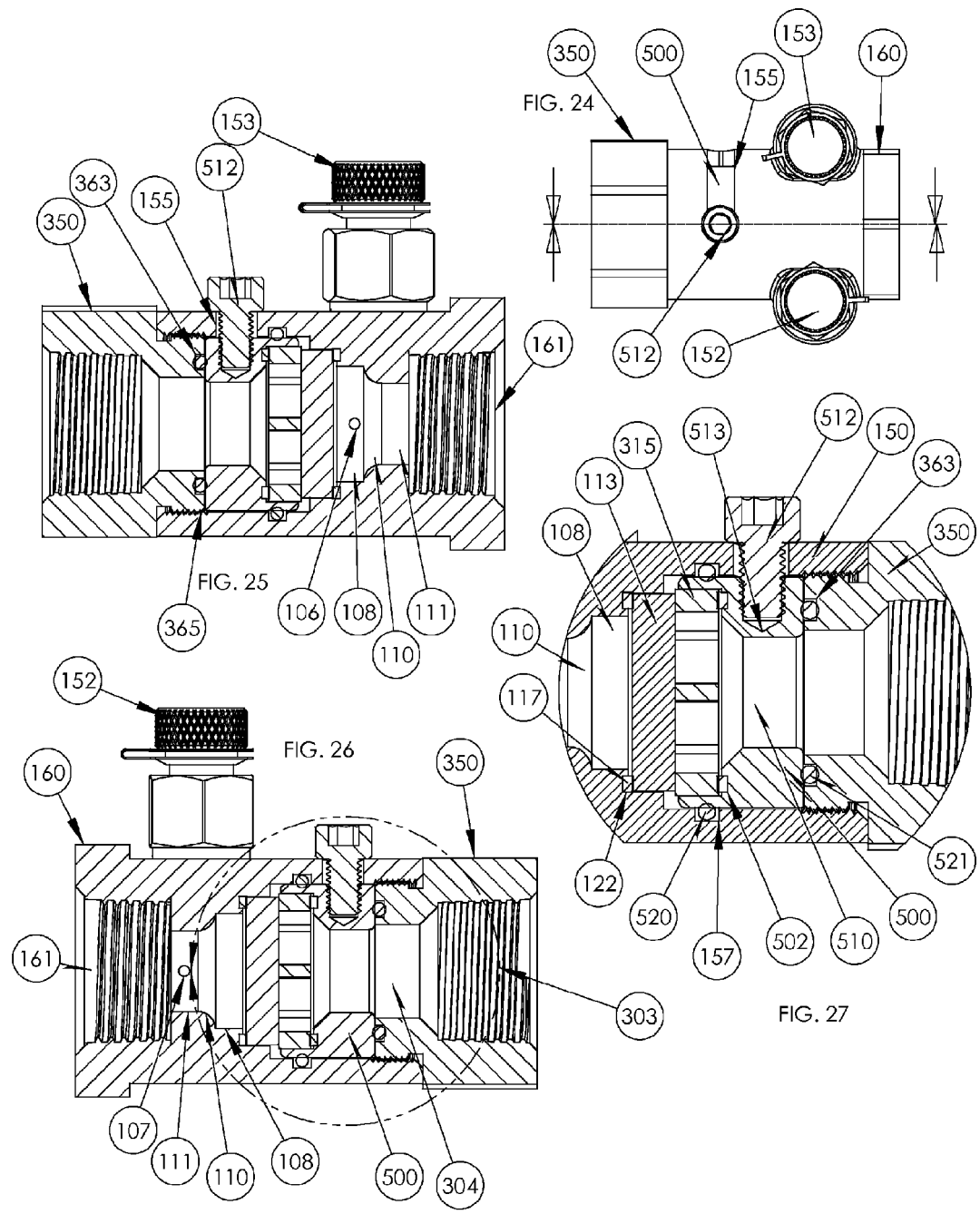

AXIALLY ALIGNED ROTATIONALLY ADJUSTABLE FLOW CONTROL VALVE

This application is a continuation of U.S. application Ser. No. 15/332,450, filed Oct. 24, 2016, now U.S. Pat. No. 10,072,761, which is a continuation of U.S. application Ser. No. 14/457,120, now U.S. Pat. No. 9,476,509, which is a continuation-in-part of U.S. application Ser. No. 14/243,611 filed on Apr. 2, 2014, now U.S. Pat. No. 9,400,057.

FIELD OF THE INVENTION

The field of this invention is the heating ventilation and cooling (HVAC) industry where fluids are the medium for the heating and cooling. Fluids that are sent from boilers or chillers are routed through piping structures which need to be balanced in terms of pressure and flow in order to even distribute the hot or cold fluids into air handler units which deliver temperature controlled air. In this industry, quarter-turn ball valves are usually used which present a host of problems and restrictions on their location and use.

BACKGROUND OF THE INVENTION

This device is used in piping system in large HVAC systems where the control of the amount of flow is desired. Currently, most controls that regulate the flow in piping systems are based on the principle shown in the quarter-turn ball valve, where the operator can have complete shutoff or full flow within a 90° turn of the handle. In the field of power assisted actuators, most all of the manufactures design them for the same quarter-turn application as well. Generally in this industry, a full port or more commonly known full bore ball valve is incorporated into the piping structures. This valve has an over-sized ball so that the hole in the ball is the same size as the pipeline resulting in lower friction loss.

There are many problems with the basic ball valve involve its inability to regulate evenly as the valve is opened or closed. This means that simply opening the ball valve a certain percentage of the total range, say 50% for example, does not equate to 50% of the total flow of the valve. This non-linear relationship between the percentage open and percentage of flow creates problems in setting the flow into a particular section of the piping system. This is because of the shape of the insert being circular. This non-linear problem can be greatly improved with the additional of a parabolic or other characterized insert into the ball opening itself.

In the disclosed invention, a venturi tubes is used to calculate pressure differential and thus fluid flow. With a ball valve, to the nature of the throttling or jetting aspects of the ball as it rotates at low percentages of openness, it is very difficult to accurately measure flow anywhere near the valve. This leads to oversizing of the pump and running the pump at a higher pump rate to compensate for the inefficiencies of a ball valve. A venturi is used whenever low pressure loss and high accuracy is desired, and due to the nature of the valve disclosed herein, the length of straight piping is greatly reduced as the pressure differential measuring means are located directly upon the valve as this valve incorporates a venturi. Due to the low pressure loss, a venturi saves the user many dollars and frequently pays for itself in one year of continuous operation by greatly reducing pumping cost.

Other problems associated with ball valves is the amount of force necessary to open or especially close the valve when under pressure as the flow of fluid fights against the closing or opening of the valve. Especially when one is trying to barely crack open the valve to let in only a minimal amount of flow. Also, due to the characteristics of the flow opening and exit of the ball itself, at low flow rates, that is a tremendous amount of cavitation and noise exist if the pressure differential is substantial across the ball itself. The critical flow in a ball valve is encountered when delta P (the differential pressure) is 0.15 P, which is far below the usual figure of 50% of absolute inlet pressure. Another issue is the handle to adjust the opening of the ball itself, as it must be located in a position where the user can access it. In piping structures where many pipes are located and space is at a premium, the knuckles of more than one person has been wracked against the piping structure when attempting to access and adjust a ball valve. Where pressures are significant, the size and length of the handle becomes a critical aspect of the operation of the valve and the need for space can drastically increase.

The current state of the art can be found to use ceramic disks that have angular segments removed that allow for the flow of fluids. These ceramic disks are used to regulate the flow of fluids in many applications, such as high end water faucets and shower fixtures. U.S. Pat. No. 7,841,362 issued to Kim on Nov. 30, 2012 shows the use of multiple disks in a faucet or water control valve, where temperature and flow are controlled. This disclosure is typical of the faucet style of control valves, where two sources of fluid are mixed and flow is controlled. These valves have the discharge of fluid through a spout which is basically perpendicular to the flow of the fluid. Prior art does exist to detail that ceramic disks can be used to supply and discharge fluids as well as U.S. Pat. No. 7,373,950 issued to Huang on May 20, 2008 demonstrates where a single set of disks control the mixing of hot and cold water from two distinct sources and regulates the outbound flow of water through the same disks.

One of the deficiencies of the current state of the industry as well as the prior art is that a valve, that can go to complete shutoff and maximum flow with a 90 degree rotation about the axis of fluid flow, cannot also be capable of measuring the differential pressure between the inlet and outlet of the valve. Current ball valve technology, which through the use of parabolic or other inserts to the ball can approach a more linear relation between the percentage of openness of the ball to the percentage of maximum flow through the valve, does not have the capabilities to have a pre-set Cv in association with the ball valve.

Additionally, due to the surfaces upon which the fluids impact upon when the ball valve is turned and due to the close tolerances required to prevent fluids from leaking past the ball portion of the valve, it is imperative that the fluids be free from any hard impurities that can scratch or mar the surface of the ball and that can damage the exposed O-Rings. Furthermore, since the O-Rings are exposed to the fluids on a daily basis, the chance for O-Ring degradation due to reactions with the fluids is greatly enhanced, leading to failure and leakage. To prevent this possible degradation, some manufactures use Teflon seals which facilitate a sealing function as well as creating a surface with less friction than O-rings.

Another issue with using ball valves is that the user most still incorporate a venturi and high and low pressure test probes to measure the flow of the fluid. Since cavitation and throttling may occur with the use of a ball valve, the venturi must be location a sufficient distance away from the ball valve in order to more accurately measure the flow. This could cause problems in the reading and adjusting the flow in a particular section of a piping structure.

It is an object of this invention to create a device that will enable the user to adjust the flow of fluid in a piping structure where space is at a premium and where accuracy of the fluid flow is critical.

It is a further object of this invention to provide the user with a valve whose adjustment is axially relation to the flow of fluid. This axial relationship provides for a more compact unit and which more accurately controls the flow using linearly related flow control disks.

It is a further object of this invention to provide a device with which the user can measure the differential pressure as the device is being operated so that flow can be accurately measured at the actual valve as it is being adjusted. It is desirable that the space required for this measurement be compact in nature and close to the body of the valve for the most accurate measurement as well as being compact for the tight spaces that it will likely be experiencing.

It is a further object of this invention to provide an embodiment of this device where be a Cv can be set for this valve, through the use of flow control disks, whereby the user has an axially controlled valve with a set maximum Cv, said valve being able to go to complete shutoff.

Accordingly, it is the goal of this invention to create an adjustable valve that is axially related to the fluid flow, containing port to determine the actual flow of the fluid, that has the aforementioned characteristics of simplicity, accuracy, adaptability to current uses and safety.

BRIEF SUMMARY OF THE INVENTION

Accordingly, this application discloses a valve that is adjusted axially along the axis of the flow of fluid. This valve is adjusted by the rotation of the body of the valve where the valve is part of a piping structure. Along with the adjustment portion, there is also the addition of two test ports for high pressure and low pressure measurement, said ports being integral with the rotational member. The valve rotates through 180° from a complete shutoff to maximum flow and back to complete shutoff within the 180°. The valve is able to be rotated simply by hand control and does not need any tool due to the design of the interface between the control disks and the minimal need for O-rings interference. Furthermore, the valve has a set screw that is attached to an external boss, which is used to lock the valve in place and prevent any unwanted rotation. The valve either has a stop at 180°, so that the user cannot continue past 180° or the valve does not have a stop and allows the user to then complete the rotation for the full 360°. As stated, test ports are integral with the rotating member so that there is an instant feedback of the pressure differential between the high side and the low side of the valve so that one can calculate flow. Since this valve design does not permit increases in cavitation or turbulent flow in the piping system, it is possible to measure the pressure differential at a location that is very close to the actual adjustment means, which is one of the drawbacks with normal ball valves.

The valve has two control disks, one stationary and one that is movable and it is the interface between openings on both disks that allow the user to select a particular flow rate. Due to the smoothness of the disks, which are preferably made of ceramic materials, the friction moment is greatly reduced even under high pressure fluid flow.

As an embodiment the user can incorporate an adjustable Cv control disk into the valve so that the maximum Cv or maximum flow rate can be established for the valve. This allows the user to set the flow rate and also allows the system to be able to anticipate the maximum flow coming out of the valve.

Another embodiment is the addition of a larger Cv control surface which will enable the valve to rotate through up to a total of 300° of rotational movement. This allows a user to more finitely adjust the valve over a larger rotational range and can accommodate higher Cv values. The 300° degrees of rotation is not a limiting factor this invention, but rather a range of motion that will be most suitable for the application in HVAC piping structures.

BRIEF DESCRIPTION OF SEVERAL VIEWS OF THE DRAWINGS

In FIG. 1, in a view of the valve where the viewer is looking into the test ports of the device. This will be called the upper view.

In FIG. 2, the view is of the inlet side of the valve with the test ports pointing downwardly.

In FIG. 3, the view is of the outlet side of the valve with the test ports pointing downwardly.

In FIG. 4, an upper oblique view of the valve is shown with the outlet of the valve being exposed.

In FIG. 11, a detail of only the outlet portion of the valve is shown along with the primary flow control regulating means.

In FIG. 12, a detail of only the outlet portion of the valve is shown along with the secondary flow control regulating means, where the primary flow control regulating means has been removed from the view for clarity.

In FIG. 13, an oblique view of the valve is shown where the outlet portion has been removed and only the primary flow control regulating means is shown.

In FIG. 14, an oblique view of the valve is shown where the outlet portion has been removed and the primary flow control regulating means is also removed to detail the inner bore of the body of the valve In FIG. 15 and FIG. 15A, the primary flow control disk is shown in a frontal and an oblique view respectively, where the disk is used in an application where the valve is capable of complete shutoff every 180° degrees.

In FIG. 16 and FIG. 16A, the secondary flow control disk is shown in a frontal and an oblique view respectively, where the disk is used in an application where the valve is capable of complete shutoff every 180° degrees.

In FIG. 17 and FIG. 17A, the variable Cv or variable flow regulating control disk is shown in a frontal and an oblique view respectively, where the disk is used in an application where the valve is capable of complete shutoff every 180° degrees.

In FIGS. 18 and 18A, the primary flow control disk is shown where the embodiment of having a range of motion greater than 180°.

In FIG. 19 and FIG. 19A, the variable Cv or variable flow regulating control disk is shown in a frontal and an oblique view respectively, where the disk is used in an where the embodiment of having a range of motion greater than 180°.

In FIG. 20, the 2 piece embodiment of the axial valve is shown on the left side elevation of the valve detailing the high pressure port.

In FIG. 21, the 2 piece embodiment of the axial valve is shown on the right side elevation of the valve detailing the low pressure port.

In FIG. 22, the top elevation of the 2 piece embodiment of the axial valve is shown.

In FIG. 23, a frontal oblique view of the right side of the 2 piece embodiment of the axial valve is shown, detailing the adjustment slot and screw.

In FIG. 24, the top elevation is shown of the 2 piece embodiment of the axial valve where cross-sectional dividing lines are shown.

In FIG. 25, the cross-sectional view of the 2 piece embodiment of the axial valve is shown viewing the interior of the valve from the left side.

In FIG. 26, the cross-sectional view of the 2 piece embodiment of the axial valve is shown viewing the interior of the valve from the right side.

In FIG. 27, a portion of the cross-sectional view of the 2 piece embodiment of the axial valve is shown viewing the interior of the valve from the right side detailing the adjustment carrier.

DETAILED DESCRIPTION OF THE INVENTION

Figure 5:
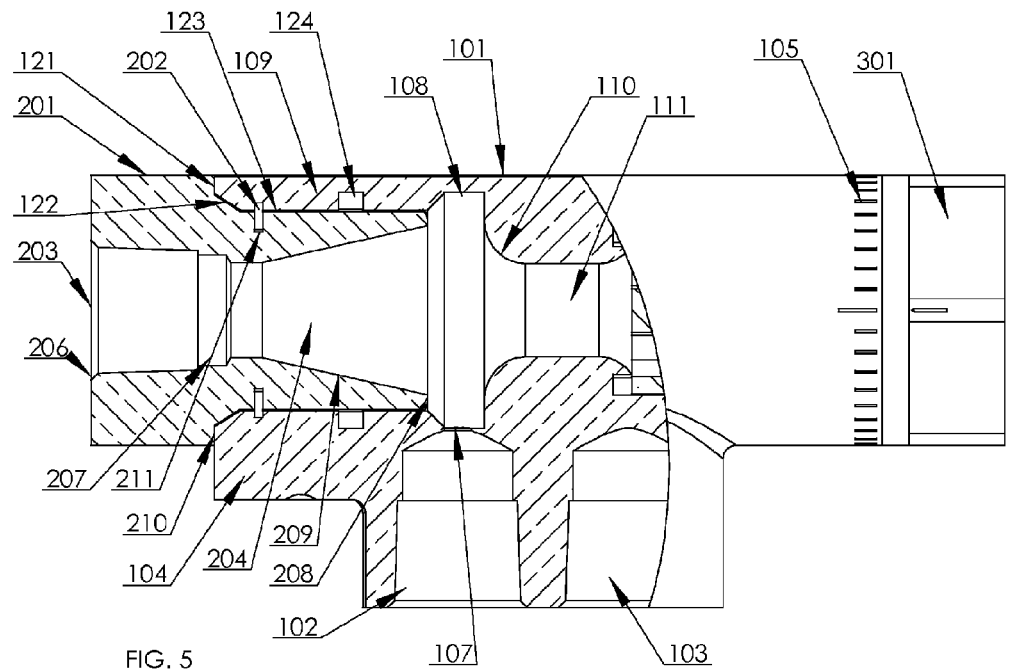
In FIG. 5, a side profile view of the valve is shown with a cutaway view through the body of the valve is shown detailing the inlet portion of the valve and the first metering section.

This invention as disclosed in the drawings has the principle use in the HVAC environment but there exists no limiting language to prevent this invention to be practiced in other fields of use. The invention consists of three main elements, inlet section, a body and an outlet portion. This invention is an adjustable valve that is adjusted axially to the flow of the fluid, with the further embodiments of ports that are designed to report differential pressure through the valve and whereby the Cv of the valve can be set and still have the valve go to complete shutoff.

In FIG. 1, the valve is shown with its three main sections; a central body 100, an inlet portion 200 and an outlet portion 300. Shown in this view are differential pressure measurement means, shown as ports 102 for high side pressure and port 103 for low side pressure. It is disclosed that this invention will function without ports 102 and 103 as the measurement of differential pressure across this valve can be done through the use of other independent devices. It can be seen in this FIG. 1 that high side pressure test port 107 is at the base of high side pressure monitoring port 102. Similarly, low side pressure test port 106 is located at the base of low-pressure test port 103. Both ports 102 and 103 are internally adapted, by threads or other means, to accept industry standard pressure probes, which can include those probes that are capable of measuring pressure and temperature. Located between inlet portion 200 and high pressure port 102 is set screw boss 104 therein located on boss 104 is threaded set screw through hole 112. It is the procedure for the user to adjust the device to the desired flow, and then use the set screw to lock it in place preventing further rotation. Located appurtenant to outlet 300 is angular displacement index 105 which corresponds in 90° increments to major angle indicator 106. It is the relation of the increments on index 105 to angular displacement guide 310 that is located on outlet portion 300, so that the user can reference the amount of rotation that has been accomplished through a number of degrees. Guide 310 is located upon the hex-nut 301. Both outlet hex-nut 301 and inlet hex-nut 201 are shown as hexagonal connecting members, but there is nothing in this application that defines and/or limits the shape or size of either of the flanges. Body 100 is defined as a cylindrical member 101 that can either have a smooth or polygonal exterior surface. Inlet portion 200 and outlet portion 300 defined the two ends of the cylindrical member 101, where the inlet portion 200 is defined as the proximal end and the outlet portion 300 is defined as the distal portion.

It is in FIG. 2, that the valve is shown with inlet portion hex-nut 201 facing the observer. As references one can see set screw boss 104 and high pressure test port 102. In this view primary control disk 113 is seen in its closed position. The opening that defines inner bore 203 is defined as sharing a common central axis to the cylindrical member 101. Inlet lead-in bevel 206 allows the operator to more accurately insert the connecting member into the body. It is noted that the piping system connection means are located at the distal end of inlet section 200 and outlet portion 300 respectively, are not adapted to any particular piping structure connecting means. In this embodiment of this invention, connection means are internally threaded couplings which have a described hexagonal external interface, which is commonly known in the plumbing industry as inlet hex nut 201 and outlet hex nut 301, which are located at the distal end of inlet section 200 and outlet portion 300 respectively. This device, though commonly using national pipe thread threads, can be adapted to a piping system by a sweated or swaged joints or any other common plumbing practice joinery. In FIG. 3 we see the opposite end from FIG. 2 as hex-nut 301 is shown, and low-pressure port 103 is shown for reference. Secondary control disk 315 is shown and primary control disk 113 is shown as well. It is the relationship between the two that details that is in a closed position as the two control disks are diametrically opposed in their position. Interior bore 303 has a common bore that is coincident to bore 203 and outlet lead in bevel 317 assists the operator in inserting the piping joints. FIG. 4 is an oblique view of the upper portion of the valve. Reference is made throughout this application as the upper portion of the valve as being that portion containing the high pressure and low pressure ports 102 and 103. FIG. 4 details the outlet bore 303 along with lead in bevel 317 along hex-nut 301.

FIG. 5 is a cutaway version of the valve which details the inlet portion as well as the first half of the main body. Lead-in bevel 206 is located about the entrance of bore 203. Further interiorly located in the center of opening of bore 203 is stepped down region 207 which provides entrance to the venturi 204. The venturi is a commonly used device in the plumbing industry. The venturi allows for the measurement of the volumetric flow rate of the fluid going through the valve as there is a direct relationship between the high side and the low side pressure difference and the fluid speed through the valve, where fluid flow increases as the cross-sectional area decreases, which is based on Bernoulli's principles. This step down from bore 203 to the entrance of venturi 204 is shown as rough steps which is common for manufacturing to create a bore pattern using smooth sides and sharp corners as that is the shape of the boring tool. There is nothing that prevents the disclosure of a smoother transition between board 203 and venturi 204. Venturi wall 209 is a conically described section which terminates at the proximal end of inlet portion 200 along inlet portion termination wall 208. Inlet portion 200 fits into cylindrical member 101 along the common bore between the two parts. Along the exterior of inlet portion 200 is snap ring groove 211 which holds snap ring 202, said snap ring 202 secures the inlet portion 200 onto cylindrical member 101. Inlet portion 200 butts against cylindrical member 101 along the joint between the interior flange wall 210 and body exterior collar 121. Distal portion 109 of cylindrical member 101 contains O-ring groove 124. The O-ring that sits in O-Ring groove 124 is not shown so as to maintain the clarity of the drawing. Venturi 204 terminates into low-pressure sensing ring as part of cylindrical member 101. It is seen in FIG. 5 high-pressure testing port 107 is in direct contact and relations there with circular venturi sensing ring 108 so that the low pressure can be measured. High-pressure port 102 is shown with smooth walls but is designed to adapt to any size and or connection type, including the common NPT thread, that is available on the testing probes. Though desirable to remain located with the valve, the testing probes can be removed and used on other applications. After the fluid passes through sensing ring 108 it is throttled down through throttling area 110 after which the now higher pressure fluid flows into interior channel 111 prior to the fluid de-throttling into primary control disk 113. The fluid flow through interior channel 111 is at a higher pressure than it was going through the low-pressure sensing ring. It is at the end of channel 111 that low-pressure sensing port 106 is seen on FIG. 6.

Figure 6:
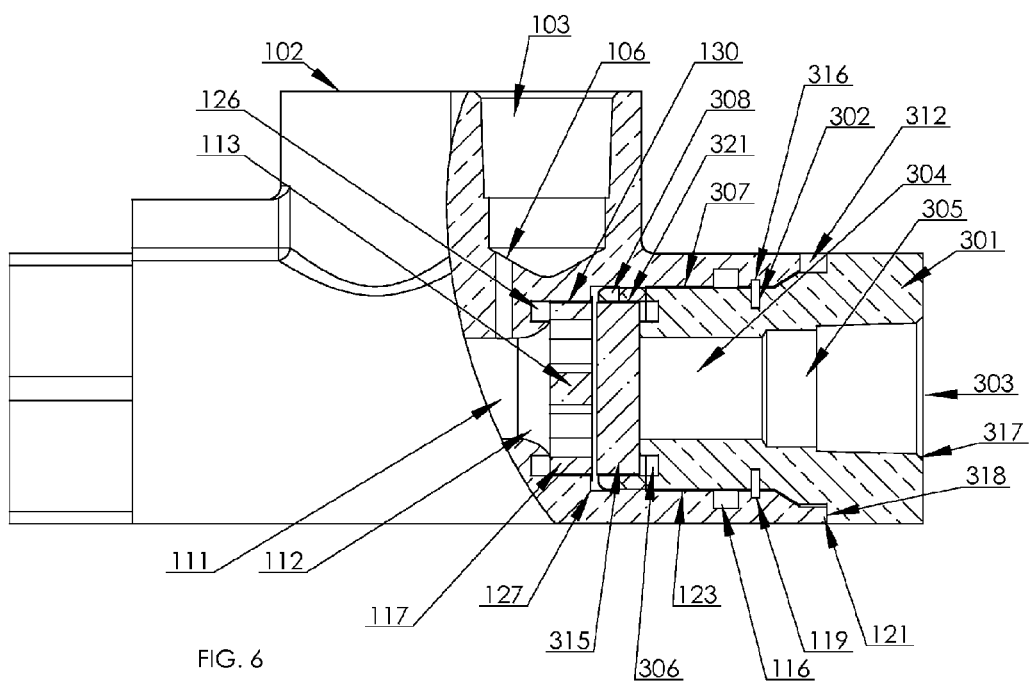
In FIG. 6, a side profile view of the valve is shown with a cutaway view through the body of the valve is shown detailing the regulating means and the outlet portion of the valve.
Figures 7, 8, 9, 10:
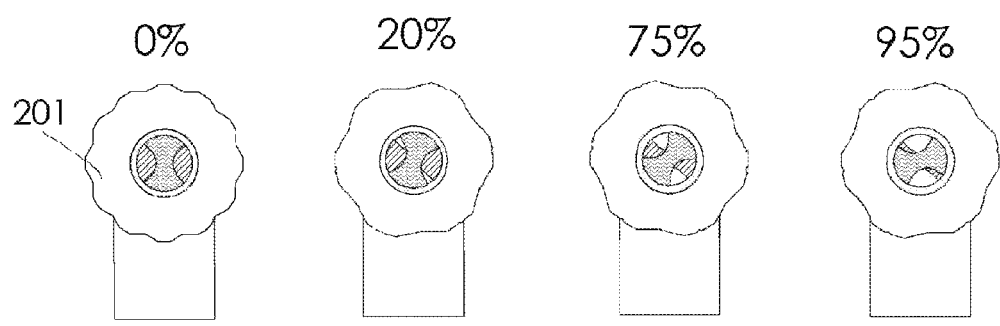
In FIG. 7 through FIG. 10, is a series of views looking at the valve from the inlet side, where the valve has been adjusted to various flow amounts, as shown as a percentage of total flow. One can observe the different regulating means as they interact with one other by the difference in the cross hatching.

FIG. 6 details the outlet and of the valve. Primary control disk 113 is placed upon O-ring that is compressed upon in O-ring groove 126 by disk 113 as disk 113 is tightly fit and secured into primary disk enclosure 130, where the purpose of the O-ring is to seal the disk preventing blow-by of the fluids as well as to promote contact with the secondary flow control disk 315 through the compressive and expansive characteristics of a circular sectioned O-Ring. Again the O-ring is excluded for purposes of clarity. Primary control disk 113 has two locating tabs 117 located 180° opposite along the exterior of the primary control disk 113. Tabs 117 of primary disk 113 are securely located into primary disk securement slots 125 located on cylindrical member 101 as more clearly seen in FIGS. 13 and 14. FIG. 6 also shows rotation stop 312 which is placed to prevent rotation of the cylindrical member 101 past a set number of degrees, which in this case would be 180°. The valve uses the rotation stop as a convenience versus a necessity as there is no harm to the valve should the user completely rotate the body 360° except for issues with the differential pressure probes.

Outlet portion 300 has centered through it bore 303 which has a common axis with bore 203 and channel 111, lead-in bevel 317 being centered about bore 303, which has a similar step down region 305 that has sharp side, again referring to common tooling nomenclature of the industry. Region 305 steps down into central outlet bore 304 which is in fluid communication with secondary control disk 315. Secondary control disk 315 also has locking flanges 308 which slide into slot 316 which holds disk 315 in place. As with the primary control disk 113, secondary control disk 315 also is tightly fit and secured into secondary disk enclosure 321 and compresses upon an O-ring that fits into O-ring groove 306, the O-ring is not shown for purposes of clarity and adapts the characteristics of sealing and compressive resistance as the O-Ring provides to the primary control disk 113. It can be shown that snap ring 316 sits in groove 302 of the outlet portion 300 and interfaces with body 101 through snap ring channel 119. This snap ring secures outlet portion 300 into body 100. Located interiorly from snap ring 316 is O-ring groove 116 which provides additional sealing for outlet portion 300, as before O-ring is not shown for purposes of clarity. All O-rings used in this device are common O-rings with a circular cross-section that are used in the industry, constructed of a material that does not degrade in the presence of the proposed fluids going through the about. In this case buna-nitrile, silicon or EPDM O-rings can be used, as water is the proposed fluid. Proximal edge 318 of outlet portion 300 butts up against outside flange wall 121 and there is a close fit tolerance between interior bore wall 307 of outlet portion 300 and the interior wall 123 of body 101. Though it is shown on FIG. 6 that primary control disk 113 and secondary control disk 315 are not in contact, this is for purposes of clarity of the drawing. In actual application O-rings that are contained in O-ring grooves 126 and 306 will maintain the control disks in constant contact. Furthermore the pressure and flow of the water will push the disks together further preventing any leakage between the deaths The two control disks are ground smooth and have a surface roughness of no greater than 0.2 of a micrometer.

FIGS. 7, 8, 9 and 10 show the relationship between the primary and the secondary control disks 113 and 315 respectively. Being viewed from the inlet hex-nut 201 as the valve body rotates one can see how the primary control disk shown with the wavy lines rotates through the stationary secondary control disk shown with the straight lines.

FIG. 11 is a view of the outlet portion 300 as can be seen the interior bore wall 307 defines the piece. Snap ring groove 302 a shower and at the proximal and the distal and is defined by termination wall 313. Primary control disk 113, though not being part of the outlet portions 300, is shown for reference only. One can see the tab 117 as well as the defined opening 120. Shown in this view is rotation stop 312 which can be used if the purchaser of the product wants only 180° rotation or any specified angle as we will see later that the maximum rotation is 300°. The maximum of 300° rotation is not a limiting feature of this invention. The shape of the openings in the secondary disk 315 can be adapted to any finite number of degrees, but it found that in the practicing of this invention in the HVAC industry, approximately 300 degrees of rotation would be the most adaptable to the application of this invention. Rotation more than 330 degrees might cause issues with test probes inserted into the test ports 102 and 103 along with problems associated with the secondary disk 315. It is important that the user be able to have a positive stop to know when the valve is flowing at its maximum or minimum valves. FIG. 12 is the same view as FIG. 11 scans primary control disk 113. Secondary control disk 315 is shown flush with termination wall 313 as disk 315 is positioned into disk enclosure 321, where disk enclosure 321 contains O-ring groove 306. Secondary control disk 315 being held in place by tabs 308 which fit in the slot 316. As can be observed between FIG. 11 and FIG. 12 the opening 120 of primary control desk 113 interfaces with the closed portion of secondary control disk 315. This would be in the closed state.

FIG. 13 is a view of the body and inlet portion distally related to the bore of the body. As can be seen the outlet portion 300 has been removed so that we can observe the inside of body 101. Primary control disk 113 can be seen with tab 117. FIG. 14 shows a view of slot 125 as it is cut into the bore of the body 101, termination shelf 127 is shown in FIG. 13 along O-ring groove 116 and snap ring 119. Rotational stop 118, interfaces with rotation stop 312, is located at the proximal edge 121 of body 101. Rotational stop 118 works in conjunction with rotation stop 312 providing the user a positive stop to know when the user has fully opened or closed the valve. In this particular example rotation stop 312 interfaces with rotational stop 118 and provides the user with an approximate 300° rotation. In other embodiments the rotation stop 312 and rotational stop 118 can limit the user to 180° of rotation. In embodiment of the valve has a tactile feel so that each incremental rotation through guide 105 of the valve can have an indent and detent combination so that the user can feels the rotation and notice that each tactile bump represents a number of degrees.

FIGS. 15 and 15A shows a detail the primary control disk where there are two openings. The primary control disk 113 that has two 90° angular sections or openings in the face of the disk. FIGS. 16 and 16A show the matching secondary control disk 315 having two 90° angular sections or openings in the face of the desk. FIGS. 15 and 16 disclose disks with two 90° circular segments where the radius of the segment is less than the radius of the disk. The radius and chord sections of each of the circular segment on the primary and secondary control disk must be coincident. The segments are cut out of the where the operator has 180° to go between any of the two extremes, such as 180° from shut off to shut off or 180° from full-flow to full flow. There is no limit to the number of angular sections on a particular disk so long as the disk has an equal number of closed sections that will interface with a similar number of sections on the secondary disk so that the valve can completely shut off the flow of fluids through the valve.

FIGS. 17 and 17A show the variable Cv disk 415 that can be used as an embodiment to this device. The Cv is defined by the geometry of the arc's radius and chord. As can be seen disk 415 works with primary disk 113, where that the design of disk 415 is unique to a defined Cv or maximum flow. The variable Cv Disk 415 has a crescent shaped arcs where the major arc has a defined diameter based on the diameter of disk and a minor arc of lesser diameter is tangentially placed against first arc, and the surface area of the opening defines the maximum flow. Disk 415 is factory set for example to 5 gallons per minute, so that the maximum flow through the valve is set by the disk 415. The rotation of this style of desk is 180°. The interface between Cv disk 415 and primary disk 113, is that disk 113 rotates about the fixed Cv disk regulating flow up to the maximum flow rate as described by the arcs through a rotation of 180°.

FIGS. 18 and 19 detail an embodiment where a set of disks selected by the user sets a particular Cv from the factory and the valve can rotate up to 300°. With this increase in angular rotation, a more finite adjustability is introduced into the valve and the design of secondary disk 415A allows for a more linear relationship between the percentage of the valve opening to the percentage of maximum flow of fluids through the valve. Disk 113A is similar in function as primary disk 113 and disk 415A is similar in design and function as secondary disk 415. The radius of the major arc is less than the radius of the secondary disk 41 5A and the minor arc is not tangentially located but is more centrally located and is defined mathematically according to the surface area desired based on the maximum Cv or flow rate required of the valve. The valve body, using rotation stops 118 and 312, allows the user a finer control of the valve through the entire adjustment range of up to 300°.

Another embodiment, not shown on the drawings is the addition of a piezometer ring or averaging annulus ring in place of low pressure sensing ring 108. This piezometer ring is used when the valve is not located on a length of pipe that is sufficiently for a distance to accurately measure the pressure differential with a regular circular cylindrically shaped venturi sending ring 108. The concept of the piezometer ring is to create a much finer ability to more accurately sensing the low pressure so that the valve can operate with a higher degree of accuracy.

An embodiment utilizing a two piece design in detailed in drawing FIG. 20 through 27. In this embodiment, the body does not rotate about the flow of the fluid, but contains the principal elements of having the pressure test ports to high and low side pressures along with a venture, but the main axial body is replaced with an flow control disk carrier which functions in the same manner as the body 101 as in the principle disclosure in the co-pending application. This embodiment introduces a valve that is more compact and easier to install. This embodiment utilizes the two flow control disk, 113 and 315, but can also utilize the combination of primary flow control disk 113 and secondary disk 415A with the variable Cv style of disk. In this embodiment the inlet is defined by inlet section 160 which is in embodiment is actually the distal portion of body portion 150, which is adapted for interface with an existing piping system. The connection to the piping system is through a coupling means 161, as shown in FIG. 25 where the means are a threaded connection, but can adapted to any style of interface required. Body 150 contains two pressure sensing ports as in the principle design, with low pressure sensing port 103 on the left side of body 150 and high pressure sensing port 102 on the right side of body 150. These ports are adapted to receive a pressure sensing probe. In this instance, pressure sensing probe 152 is threadably connected to port 102 which is adapted with mating threads, and port 103 is adapted to receive probe 153. Said probes 152 and 153 can also be of the type to sense temperature as well as pressure. Unique to this embodiment is adjustment slot 155 which is adapted to receive adjustment means 512, which in this disclosure is a cap style screw which when tightened into internally located flow control carrier 500 prevents movement along said slot 155. Body 150 is adapted to receive outlet section 350 on the proximal end of body 150, which in this disclosure are threadably connected to distal end of outlet 350 along interface section 365. Outlet 350 is this disclosure is threadably adapted to interface with existing piping structure through threaded opening 303.

FIG. 24 details the direction of cross-sections seen in FIGS. 25 and 26. The cross-sections disclose the interior of this embodiment. Similar to the initial disclosure, as the fluid enters past coupling means 161 it passes through fluid channel 111 into venturi 110 and into low pressure sensing ring 108. Fluid channel 111 is where high pressure is sensed through high pressure port hole 107 as seen in FIG. 26, port hole 107 being in fluid communication with port 102, where probe 152 will measure low pressure, temperature or whatever variable needed. Low pressure sensing port 106, as seen in FIG. 25, is located in low pressure sensing ring 108, where port 106 is in fluid communication with port 103 where sensing probe 153 will sense low pressure, temperature or whatever variable needed. Immediately appurtenant to low pressure sensing ring is primary flow control disk 113 which contains locating tabs 117, where tabs 117 interface with location slots 122 to securely hold disk 113 in place and to prevent it's rotation when the secondary disk 315 rotates.

Flow control carrier 500 has proximally located receiving slots 502 that will interface with tabs 316 of secondary flow control disk 315. It is the interface between the openings of primary flow control disk 113 and the openings of secondary flow control disk 315 that regulates the flow of fluid through the valve. It is critical to understand that the shape of the openings in the secondary flow control disks can either be designed as angular segments or through a variable Cv Disk 415 that has a crescent shaped arcs where the major arc has a defined diameter based on the diameter of disk and a minor arc of lesser diameter is tangentially placed against first arc, and the surface area of the opening defines the maximum flow. Carrier 500 is a free floating apparatus completely contained between body 150 and outlet section 350, whereby the carrier 500 is free to rotate about the central axis common to the fluid flow. Carrier 500 has rotation means 512 attached to the exterior surface of carrier 500 through carrier rotational means securement means 513. In this disclosure, a cap style screw 512 is threadably attached to carrier 500 through securement threaded hole 513. Screw 512 has a sufficiently narrow body which will be able carrier 150 to rotate freely through body rotational adjustment slot 155, said slot 155 being along the circumference of body 150 extending from the exterior through the interior surface of said body. Screw 512 is tighten against the exterior of slot 155 thereby preventing unwanted rotational movement of carrier 500 once the user has set the valve. The adjustment slot 155 is of a length to limit the user to adjust the flow from complete shutoff to maximum flow with positive stops at each extreme. The length of rotational adjustment slot corresponds to the shape and dimension of the segment section of the secondary disk 315 or 415. It is the rotation of the carrier through the rotation mean, said rotation being axially aligned to the flow of fluid through the valve which has a direct correlation to the amount of flow output through outlet section 350. It can be designed so that incremental marks (not shown) are placed along the exterior of adjustment slot 150 to show percentage of opening that has been accomplished through the rotation of the screw. Additionally, it is desirable to have detents placed along adjustment slot 155 so that the user can have a tactile response to the percentage open that the valve has obtained as the valve may be in a location where visible indicators are not possible.

The two styles of the secondary flow control disks as shown FIG. 15 through 19A dictate the length of the adjustment slot 155, where the start and stop limits are demarcated preventing the user from exceeding the limits. Depending on the shape of the openings, the operator can have a ¼ turn ball valve like control from complete shutoff to maximum flow. The adjustment slot will be longer should a fixed Cv style of disk be used.

Carrier 500 is isolated from body 150 and outlet 350 and is secured against leakage by two sets of O-rings. Distal O-ring 520 seals against carrier 500 and body 150 contained in O-ring groove 157. O-Ring 150 not only provides sealing to prevent blow-by past the secondary flow control disk but also provides a centering means to hold carrier 500 directly along the axis of fluid flow. Proximal O-ring 521 seals between carrier 500 and outlet section contained in groove 363. O-ring 521 not only prevents the flow of fluids outside of the prescribed fluid flow channel 510 and central outlet bore 304 but also serves as a compression means insuring that the secondary and primary disks are in compressive contact.

It can be appreciated by those appropriately skilled in the art that changes, modifications or embodiments can be made to this invention without departing from the spirit, principles, theories, ideas or conceptions that have been disclosed in the foregoing. It is herein recognized that the embodiments disclosed by this description of the best mode of practicing this invention, which will be hereafter described in their full breadth in the claims and equivalents thereof.

We claim:

1. A valve comprising:
   a valve body, an inlet end, and an outlet end, and a bore extending through the inlet end, the valve body, and the outlet end, said valve body defining a longitudinal axis of the valve;
   a first disk disposed within the valve body, disposed perpendicularly to the axis, said first disk having a first aperture through which fluid can flow, said first disk being rotationally fixed relative to the valve body;
   a second disk disposed within the bore of the valve body, disposed perpendicularly to the axis, said second disk having a second aperture through which fluid can flow, said second disk being rotatably disposed relative to the valve body;
   means for rotating the first disk relative to the second disk to move the first aperture into alignment with the second aperture to allow flow through the first and second apertures and to move the first aperture out of alignment with the second aperture to prevent flow through the first and second apertures; and
   a Venturi disposed within the body section, spaced from and proximate the first and second disks; wherein
   the first disk is rotationally fixed to the valve body, and the means for rotating comprises the valve body rotatable relative to the inlet end and the outlet end.
2. The valve of claim 1, wherein:
   the second disk is rotationally fixed to an end.

* * * * *